United States Patent [19]

Momiyama

[11] Patent Number: 4,509,849
[45] Date of Patent: Apr. 9, 1985

[54] LIGHT MEASUREMENT DEVICE FOR SINGLE LENS REFLEX CAMERA

[75] Inventor: Kikuo Momiyama, Kanagawa, Japan

[73] Assignee: Canon Kabushiki Kaisha, Tokyo, Japan

[21] Appl. No.: 578,321

[22] Filed: Feb. 10, 1984

Related U.S. Application Data

[63] Continuation of Ser. No. 356,509, Mar. 9, 1982, abandoned.

[30] Foreign Application Priority Data

Mar. 20, 1981 [JP] Japan .................................. 56-41127

[51] Int. Cl.³ ............................ G03B 7/08; G03B 7/00; G03B 17/20
[52] U.S. Cl. ..................................... 354/479; 354/480
[58] Field of Search ........................ 354/476, 479, 480

[56] References Cited

U.S. PATENT DOCUMENTS

| | | | |
|---|---|---|---|
| 3,672,284 | 6/1972 | Schwarz | 354/479 |
| 4,170,410 | 10/1979 | Sekida et al. | 354/480 |
| 4,172,643 | 10/1979 | Schulz et al. | 354/479 |
| 4,178,084 | 12/1979 | Matsumoto et al. | 354/476 |

Primary Examiner—L. T. Hix
Assistant Examiner—Douglas S. Lee
Attorney, Agent, or Firm—Toren, McGeady and Stanger

[57] ABSTRACT

In the disclosed apparatus, a photographic optical system passes light to an image plane on which a film or other sensor is to be arranged, and an optical member between the optical system and the image plane allows light from the optical system to pass while it directs light from the image plane toward a light sensor. The light sensor is outside of the light path from the optical system to the image plane.

9 Claims, 4 Drawing Figures ance with application Ser.

LIGHT MEASUREMENT DEVICE FOR SINGLE LENS REFLEX CAMERA

This application is a continuation of application Ser. No. 356,509, filed Mar. 9, 1982, now abandoned.

BACKGROUND OF THE INVENTION

The present invention relates to cameras and particularly to a light measuring device for a single lens reflex camera capable of performing TTL direct light measurement of a dark object.

A light measuring system for a single lens reflex camera, in which the exposure is determined on the basis of the light reflected by a film surface or a shutter curtain, offers a number of advantages. Such a system makes it possible to carry out real time light measurement of an object being photographed. Various kinds of devices using this TTL direct light measuring system are known. For example, as shown in FIG. 1, the bottom of a mirror box between the photographic lens 1 and the film surface 2 holds a light measuring lens 3 and a photo sensor 4 to sense the light scattered on the film surface. However, the scattering characteristics of the film surface 2 are distributed as shown by dotted lines in FIG. 1. Consequently, the photo sensing element 3 arranged at the lower part of the left side receives a larger light component reflected by the lower part 5 of the film surface 2 than by the upper part. The lower part 5 of the film surface 2 corresponds to the upper part of the object, and, in general, the upper part of the object corresponds to the light portion of the object such as the sky or a lamp in a room. Accordingly, the photo sensor receives more light from the upper part of the object than the lower part. In order to compensate for this excessive light, one may attenuate the light from the lower part 5 of the film surface 4. This attenuates the overall light and is disadvantageous for the measuring process. Further, the conventional light sensing element 4 has a small sensing area and it is difficult to carry out a quick and precise light measurement of the object with dim light.

SUMMARY OF THE INVENTION

An object of the present invention is to provide a light measuring device for a single lens reflex camera free from the shortcomings of the above-mentioned conventional devices, which is constructed so that the light measuring distribution is properly distributed, while a large amount of the measured light is received by the photo sensing element so as to permit a correct light measurement even of dim objects. The above-mentioned purpose can be achieved by arranging, around the photographing light between the photographing lens and the film surface, a means which allows the photographic light to pass toward the film surface but converges and directs the light scattered on the film surface toward the light sensing element.

DETAILED DESCRIPTION OF THE PREFERRED EMBODIMENT

Below the present invention will be explained in detail in accordance with FIG. 2 and the following drawings of the embodiment thereof.

Figure 1:
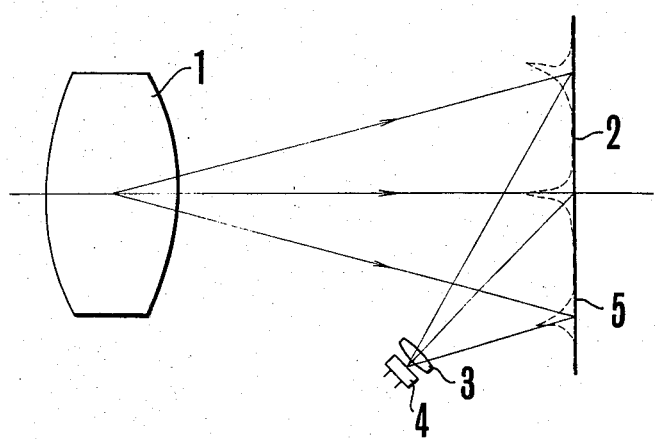
FIG. 1 shows the construction of the conventional light measurement optical system.
Figure 2:
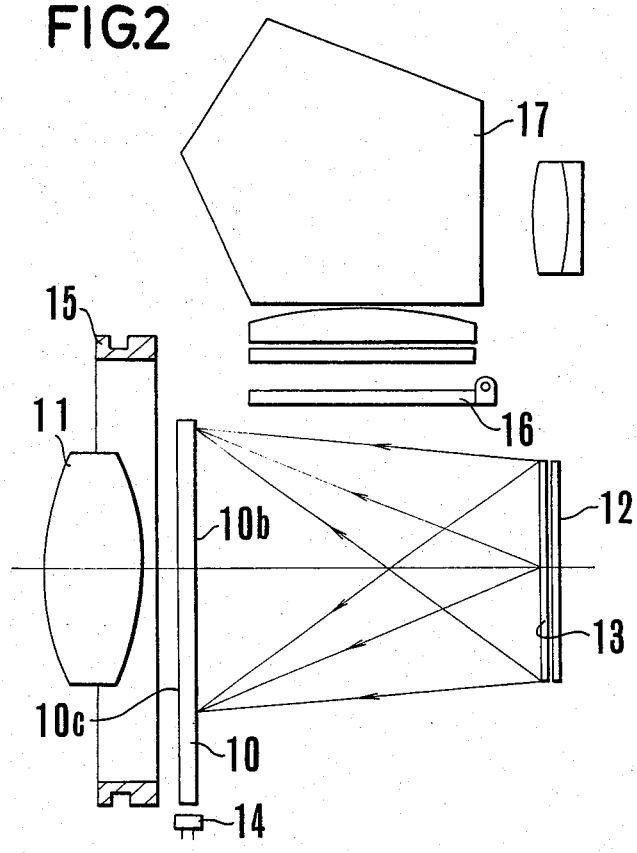
FIG. 2 shows the construction of an embodiment of the light measurement optical system of the present invention for a single lens reflex camera.
Figure 3:
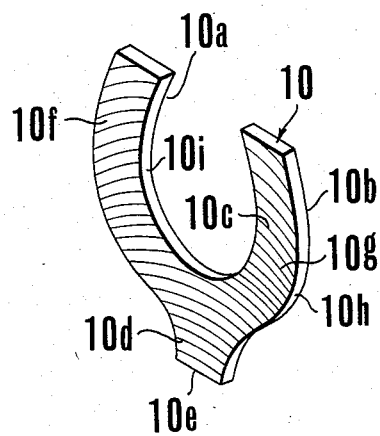
FIG. 3 shows the light converging member in perspective view.

In the drawings, a light converging member 10 for example in the shape of a horse shoe as shown in FIG. 3 is arranged between the photographic lens 11 and the film surface 12 so as to face the film surface 12. In the center of the light converging member 10 there is provided an aperture 10a large enough for allowing the light from the photographic lens to pass without being hindered by the light converging member 10. The member 10 should be as close to the lens 11 as possible in order that the aperture 10a can be comparatively small so that the incident surface 10b to be explained can be large. The incident surface 10b of the light converging member 10 facing the film surface 12 is smooth. Hence, the light reaching in the film surface 12 and the shutter curtain 13 through the photographic lens 11 and the aperture 10a of the light converging member 10 is reflected by film surface 12 and shutter curtain 13 and strikes the incident surface 10b. Further, the portion of the light converging member 10 facing the photographic lens 11 has a reflecting surface 10c, on which a Fresnel lattice is provided and which is vapour-deposited with aluminum. The Fresnel lattice is formed so as to lead the incident light downwards toward the base part 10d, whose lower surface makes a plane 10e out of which the light is led. The plane 10e has a light sensing element 14 connected so as to sense the light from the light converging member 10. FIG. 2 also shows a lens barrel 15 for holding the photographic lens 11, a movable mirror 16 and a pentagonal prism 17.

Figure 4:
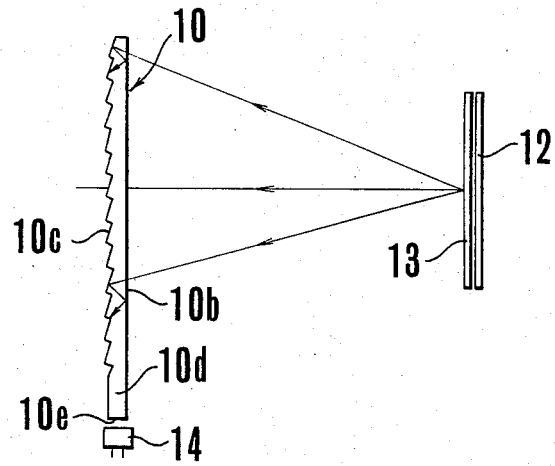
FIG. 4 shows the explanation as to how the light is converged in the light converging member.

During photography, when the movable mirror raised as is shown in FIG. 2, the photographic light reaching the film surface 12 or the shutter curtain 13 through the photographing lens 11 is scattered on the surface 12 or shutter curtain 13, and a part of the scattered light strikes the plane 10b of the light converging member 10. At this time the light converging member 10 has a large incident area and faces the film surface 12 or the shutter curtain 13 so that the whole incident plane 10b receives the scattered light evenly. Thus, an even distribution of the light measurement is obtained. Further, as shown in FIG. 4, the light striking the light converging member 10 is reflected in the member 10 slanted downwards and then totally reflected by the incident plane 10b toward the plane 10e. On the plane 10e the light sensing element 14 senses the light incident on the light converging member 10.

In FIG. 4, the angles of the Fresnel lattice on the plane 10c are all made equal. However, they can be varied from the upper to the lower portion in accordance with the incident angle on the incident light so as to obtain an effective reflection. According to an embodiment, instead of a flat plane the light converging member 10 is made concave to obtain a remarkable effect. The light converging member 10 consists of two incident parts 10f and 10g, which are curved so as to be joined at the base part 10d. However, there is a danger that the light incident on the upper portions of the incident parts 10f and 10g may leak out from the side planes 10h. This is overcome by making the planes 10h reflective by metal vapour-deposition thereon. Further, it is possible to make the light converging member 10 circular instead of horse shoe shaped, but it is comparatively difficult to direct the light incident on the upper portion to both sides so that the upper portion is eliminated. However, according to another embodiment, the inside plane 10*i* is also made a reflecting plane so it is not necessary to eliminate the top but the circular light converging member becomes possible. According to an embodiment the incident plane 10*b* of the member 10 is made a Fresnel plane and the plane 10*c* an even plane. Further, the light converging member 10 is not necessarily integral. According to an embodiment, the incident ends of a number of optical fibers are arranged around the photographic light to face the film surface 12, while the other ends are gathered and coupled with the light sensing element 14. This makes it possible to carry out the light measurement with the same effect.

In the light measuring optical system of the present invention for a single lens reflex camera, the light converging member is arranged around the photographic light facing the film surface so that there is no concern that it receives excessive light reflected on the lower part of the film surface hence, allows one to obtain a proper distribution of the light measurement. Because the light incident plane has a larger area than a conventional light sensing element which directly senses the light, it is possible advantageously to sense even a weak incident light precisely within a short time.

What is claimed is:

1. A single lens reflex camera system with a light measuring device, comprising:
    a photographic optical system forming an image plane,
    the image plane of the photographic optical system being arranged for receiving an object image sensor,
    a mirror arranged to pivot into and out of the path between said photographic optical system and the image plane;
    a finder system arranged in a direction along which light coming from an object and passing through said photographic optical system is reflected by the mirror when pivoted into the path between said optical system and the image plane;
    a light conducting member arranged between the photographic optical system and the mirror,
    said light conducting member having an incident plane and a light projecting plane, said incident plane being arranged in an arc around the light from the object passing through the photographic system and opposing the object image sensor when the object image sensor is located at the image plane for receiving a part of light reflected from the object image sensor when the object image sensor is located at the image plane and subjecting the light to repeated internal reflections within the light conducting member and then projecting the received light from the projecting plane, and
    light receiving means arranged near the light projecting plane to receive the light from the light projecting plane.

2. A device as in claim 1, wherein said light conducting member is closer to said optical system than said image plane.

3. A device as in claim 1, wherein said optical system forms an optical axis and said light conducting member lies along a plane substantially transverse to the optical axis.

4. A light measurement device in accordance with claim 1, wherein the light conducting member includes two opposing surfaces, one of said surfaces being even, while the other surface is formed as a Fresnel lattice.

5. A light measurement device in accordance with claim 4, wherein the angles of the Fresnel lattice are successively varied in accordance with the incident angle of the scattered light from the image plane on the light converging member.

6. A device as in claim 4, wherein said optical system forms a light path to pass light over substantially an entire sensor in the image plane and said optical member forms an inner aperture large enough to allow passage of substantially all light in the light path from the optical system to the image plane, and an optical material surrounding the inner aperture for receiving light from the image plane.

7. A device as in claim 6, wherein one of said two surfaces faces the optical system and the other of said two surfaces faces the image plane.

8. A device as in claim 7, wherein said member is closer to said optical system than the image plane.

9. A device as in claim 7, wherein reflective means coat the surface facing the optical system for producing interior reflections of light within the member, and wherein the surface facing the image plane is adapted to allow passage of light from the image plane.

* * * * *